(12) United States Patent
Gunnarsson et al.

(10) Patent No.: US 8,233,404 B2
(45) Date of Patent: Jul. 31, 2012

(54) UPLINK TRANSMIT POWER CONTROL

(75) Inventors: Fredrik Gunnarsson, Linkoping (SE); Eva Englund, Linkoping (SE); Erik Geijer Lundin, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 270 days.

(21) Appl. No.: 12/741,003

(22) PCT Filed: Dec. 14, 2007

(86) PCT No.: PCT/SE2007/051009
§ 371 (c)(1),
(2), (4) Date: Apr. 30, 2010

(87) PCT Pub. No.: WO2009/078763
PCT Pub. Date: Jun. 25, 2009

(65) Prior Publication Data
US 2010/0238832 A1 Sep. 23, 2010

(51) Int. Cl.
*H04L 12/26* (2006.01)
(52) U.S. Cl. .................................................... 370/252
(58) Field of Classification Search .......... 370/241–253; 455/23, 67.11, 115.1, 226.1, 456.1–457
See application file for complete search history.

(56) References Cited

U.S. PATENT DOCUMENTS
5,333,175 A * 7/1994 Ariyavisitakul et al. ..... 455/423

FOREIGN PATENT DOCUMENTS
| WO | WO 2006/069272 A1 | 6/2006 |
| WO | WO 2006069272 A1 * | 6/2006 |
| WO | WO 2006/101607 A1 | 9/2006 |
| WO | WO 2008/054150 A1 | 5/2008 |
| WO | WO 2008/101056 A2 | 8/2008 |

OTHER PUBLICATIONS
International Search Report dated Oct. 8, 2008 (4 pages).
International Preliminary Report on Patentability dated Apr. 1, 2010 (7 pages).
Written Opinion dated Sep. 29, 2008 (5 pages).

* cited by examiner

*Primary Examiner* — Anh-Vu H Ly
*Assistant Examiner* — Mang Yeung
(74) *Attorney, Agent, or Firm* — Myers Bigel Sibley & Sajovec, P.A.

(57) ABSTRACT

Control of uplink transmit power for a first mobile station operating with scheduled uplink data transmissions. A change in uplink scheduled status for the first mobile station is detected (301). Filtering of uplink interference measurements for the first mobile station is adapted (302) to account for the detected change in uplink scheduled status for the first mobile station. Alternatively a change in uplink scheduled status for a second mobile station is detected and a current filtering state for filtering of uplink interference measurements for the first mobile station is adjusted by applying an estimated expected change in interference associated with the detected change. A signal quality for uplink transmissions from the first mobile station is determined (303) based on measurements of received signal strength from the mobile station and the filtered uplink interference measurements. An uplink transmit power command is generated (304) for the first mobile station based on a comparison of the estimated signal quality to a signal quality target.

17 Claims, 4 Drawing Sheets

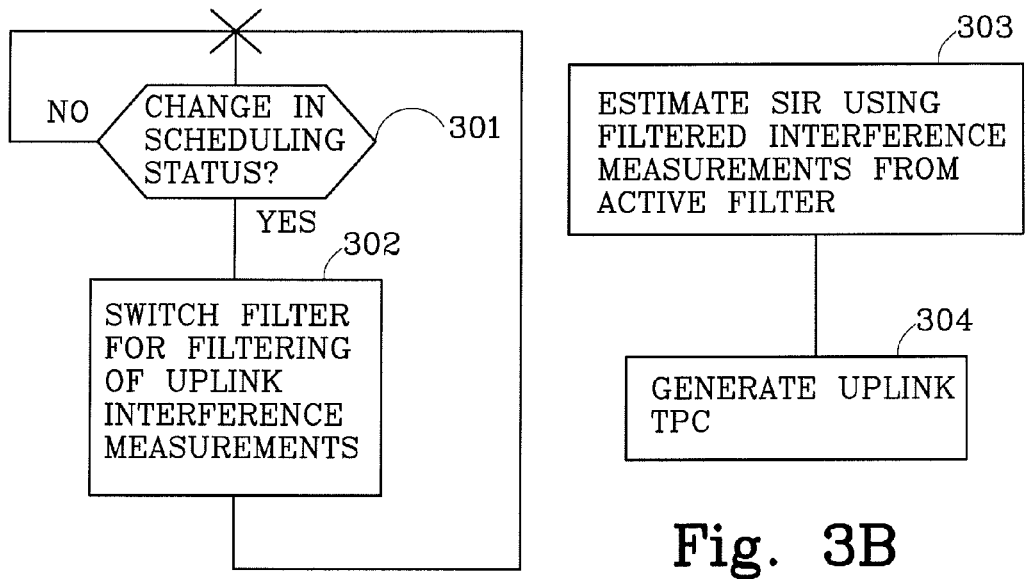
Fig. 3A
Fig. 3B
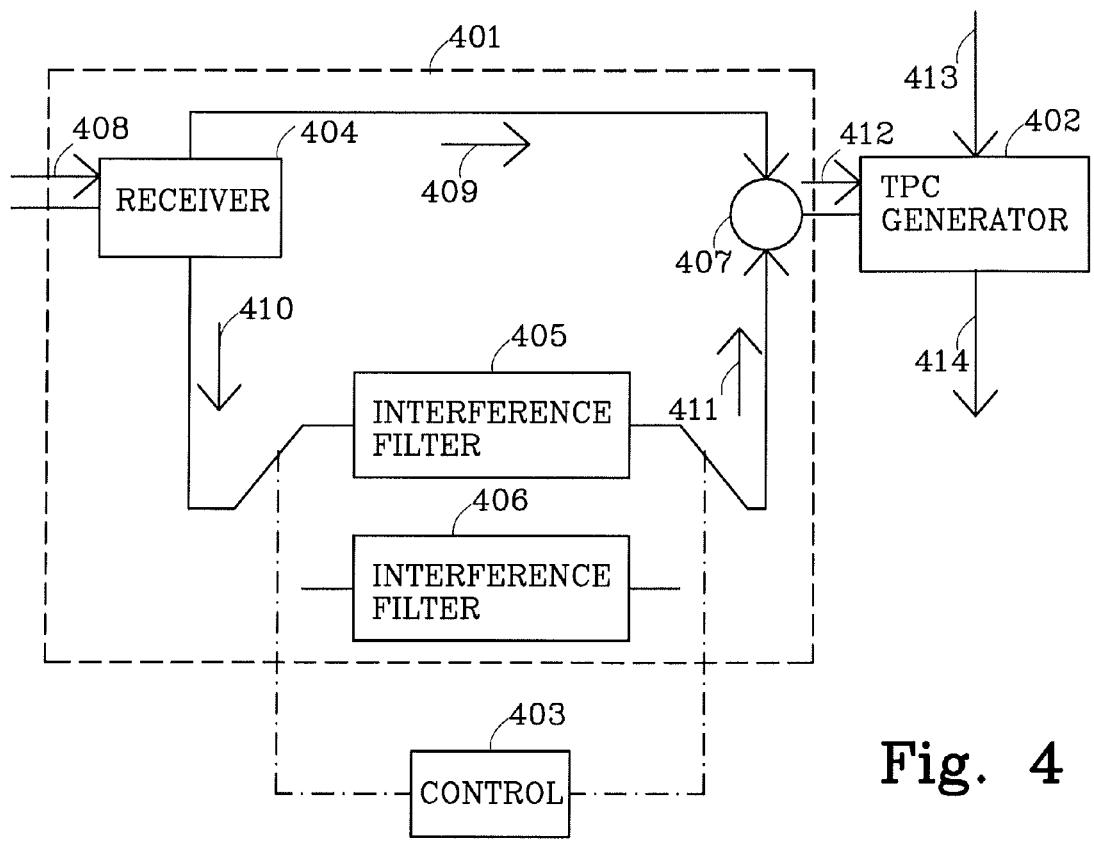
Fig. 4

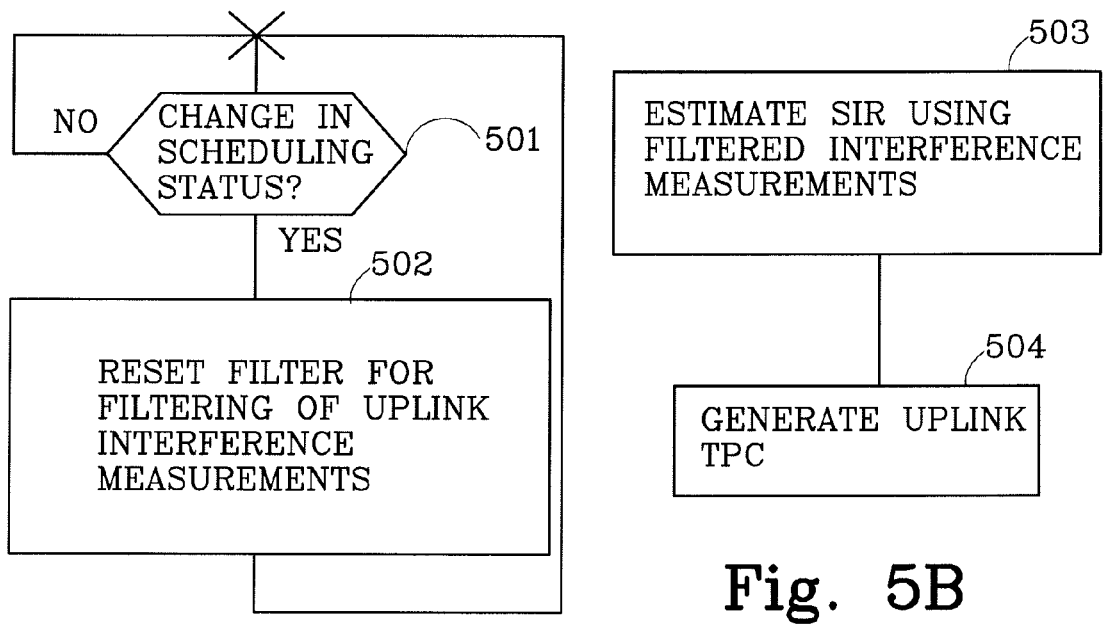
Fig. 5A
Fig. 5B
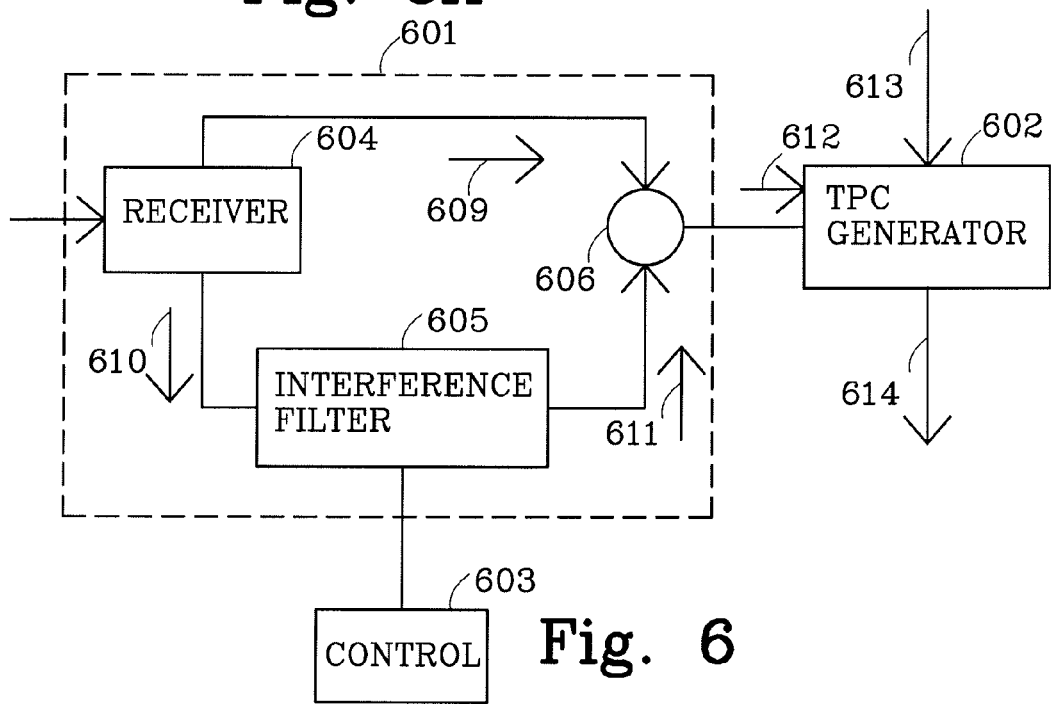
Fig. 6

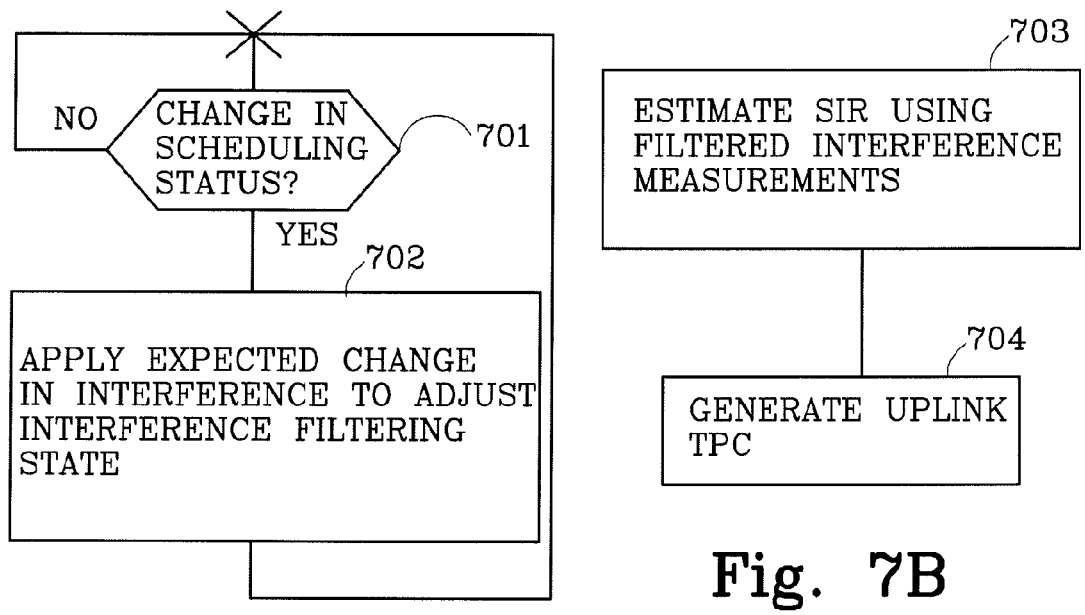
Fig. 7A
Fig. 7B
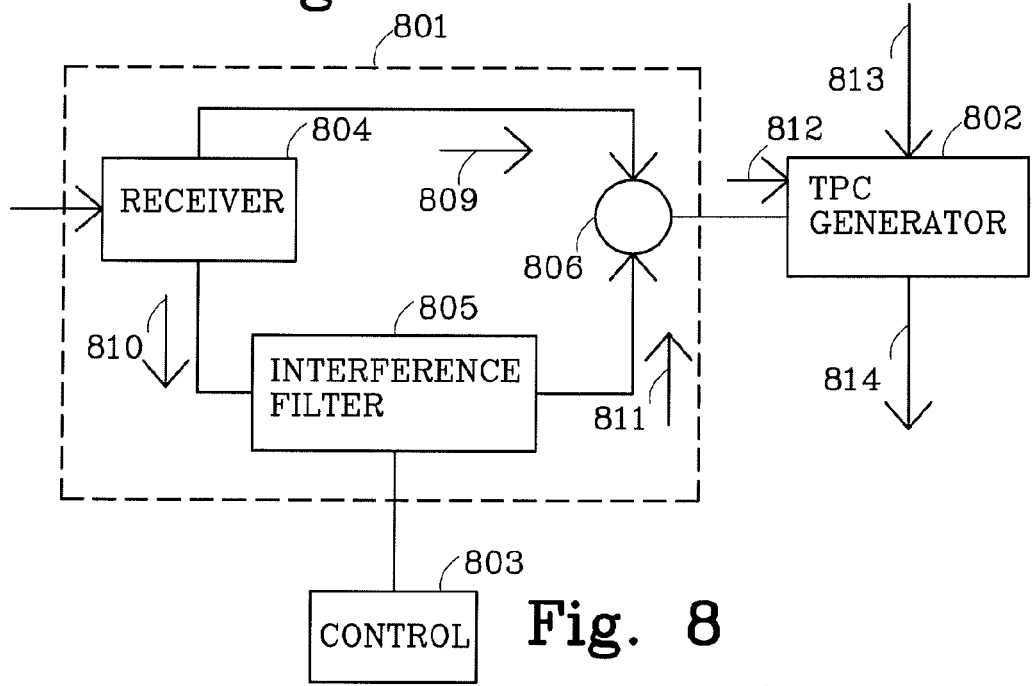
Fig. 8
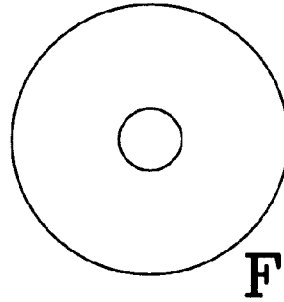
Fig. 9

UPLINK TRANSMIT POWER CONTROL

TECHNICAL FIELD

The present invention relates to method and arrangements in a wireless communication system. The invention more in particular relates to power control of radio transmissions in the wireless communication system.

BACKGROUND

Maximizing link capacity represents an important aspect of advancing the performance of wireless communication systems. The link scheduling provisions in developing standards, such as the Enhanced Uplink (EUL) in Releases 6 and 7 according to the $3^{rd}$ Generation Partnership Project (3GPP) Universal Mobile Telecommunications (UMTS) specifications, reflect this aspect of wireless communication evolution. Other standards similarly define scheduled transmission environments, such as the CDMA2000 standards, and selected Wireless Local Area Networking (WLAN) standards.

Uplink (also referred to as "reverse link") scheduling within a given radio coverage area, e.g. cell, permits one or a constrained number of users to transmit uplink data (traffic) in any given scheduling interval. Allowing only one user, for example, to transmit uplink data in any given scheduling interval prevents other user's uplink data transmissions from interfering with the scheduled user's data transmission, and effectively devotes the available uplink capacity to that user. Doing so maximizes the uplink data rate achievable by the scheduled user.

Of course, scheduling may be more sophisticated, such as by scheduling multiple users in the same interval, but perhaps with only one or two high-rate users permitted. Further, any given user may be permitted to transmit at essentially any time on an unscheduled basis, but these types of unscheduled transmissions may be constrained to a low data rate, for example. Consequently, unscheduled transmissions of this type, even if permitted, may not represent a significant source of uplink interference and the interference level does not change abruptly over time.

According to the EUL provisions mentioned, individual mobile stations operating as packet data users subject to uplink scheduling transmit a Dedicated Physical Control Channel (DPCCH) signal when transmitting scheduled data and when not transmitting scheduled data, although the signal may be gated in the latter instance. A supporting base station thus receives a DPCCH signal for each scheduled user and uses the quality of that received signal as a basis for maintaining closed loop control of each user's uplink transmit power.

As is known, such power control usually includes an inner and outer power control loop for each user. The outer loop power control sets a signal quality target, e.g. signal-to-interference ratio (SIR) target, and the inner loop power control generates up/down commands as needed, for increasing and decreasing the user's uplink transmit power as needed to maintain the signal quality at the base station for that user at the signal quality target. Outer loop power control also adjusts the signal quality target of the inner loop power control in order to maintain a specified communication quality-based target (e.g. Block Error Rate (BLER) or number of transmission attempts).

SUMMARY

An object of the present invention is enabling improved power control of uplink radio transmissions in a wireless communication system operating with scheduled transmissions.

In a first aspect, the present invention relates to a method in a wireless communication system for controlling uplink transmit power for a first mobile station operating with scheduled uplink data transmissions. A change in uplink scheduled status for the first mobile station is detected. Filtering of uplink interference measurements for the first mobile station is adapted to account for the detected change in uplink scheduled status for the first mobile station. A signal quality for uplink transmissions from the first mobile station is determined based on measurements of received signal strength from the mobile station and the filtered uplink interference measurements. An uplink transmit power command is generated for the first mobile station based on a comparison of the estimated signal quality to a signal quality target.

In a second aspect, the present invention relates to a radio base station capable of controlling uplink transmit power for a first mobile station operating with scheduled uplink data transmissions. The radio base station includes estimating means for estimating signal quality for uplink transmissions from the first mobile station based on measurements of received signal strength from the first mobile station and filtered uplink interference measurements. Generating means in the radio base station are arranged for generating an uplink transmit power command for the first mobile station based on a comparison of the estimated signal quality to a signal quality target. Detecting means in the radio base station are arranged for detecting a change in uplink scheduled status for the first mobile station. The estimating means are adapted to account for detected changes in uplink scheduled status for the first mobile station by adapting filtering of the uplink interference measurements to account for the detected change in uplink scheduled status.

In a third aspect, the present invention relates to a method in a wireless communication system for controlling uplink transmit power for a first mobile station operating with scheduled uplink data transmissions. A change in uplink scheduled status for a second mobile station is detected. Filtering of uplink interference measurements for the first mobile station is adapted to account for the detected change in uplink scheduled status for the second mobile station by applying an expected estimated change in interference associated with the detected change in scheduling status for the second mobile station to adjust a current interference filtering state for the first mobile station. A signal quality for uplink transmissions from the first mobile station is determined based on measurements of received signal strength from the mobile station and the filtered uplink interference measurements. An uplink transmit power command is generated for the first mobile station based on a comparison of the estimated signal quality to a signal quality target.

In a fourth aspect, the present invention relates to a radio base station capable of controlling uplink transmit power for a first mobile station operating with scheduled uplink data transmissions. The radio base station includes estimating means for estimating signal quality for uplink transmissions from the first mobile station based on measurements of received signal strength from the first mobile station and filtered uplink interference measurements. Generating means in the radio base station are arranged for generating an uplink transmit power command for the first mobile station based on a comparison of the estimated signal quality to a signal quality target. Detecting means in the radio base station are arranged for detecting a change in uplink scheduled status for a second mobile station. The estimating means are adapted to account for detected changes in uplink scheduled status for the second mobile station by applying an estimated expected change in interference associated with the detected change in scheduling status for the second mobile station to adjust a current interference filtering state for the first mobile station.

In yet another aspect, the present invention is a computer program embodied on a computer-readable medium and executable by digital data processing circuitry to perform any one of the methods recited above.

An advantage afforded by the invention is that it enables improved power control of scheduled uplink data transmissions.

The invention will now be described in more detail with reference to exemplary embodiments thereof and also with reference to the accompanying drawings.

BRIEF DESCRIPTION OF THE DRAWINGS

FIG. 3A-3B are flow diagrams illustrating a first exemplary embodiment of a method in a wireless communication system according to the invention.

FIG. 4 is a block diagram illustrating a first exemplary embodiment of a radio base station according to the invention.

FIG. 5A-5B are flow diagrams illustrating a second exemplary embodiment of a method in a wireless communication system according to the invention.

FIG. 6 is a block diagram illustrating a second exemplary embodiment of a radio base station according to the invention.

FIG. 7A-7B are flow diagrams illustrating a third exemplary embodiment of a method in a wireless communication system according to the invention.

FIG. 8 is a block diagram illustrating a third exemplary embodiment of a radio base station according to the invention.

FIG. 9 shows an example of a computer-readable medium

DETAILED DESCRIPTION

Figure 1:
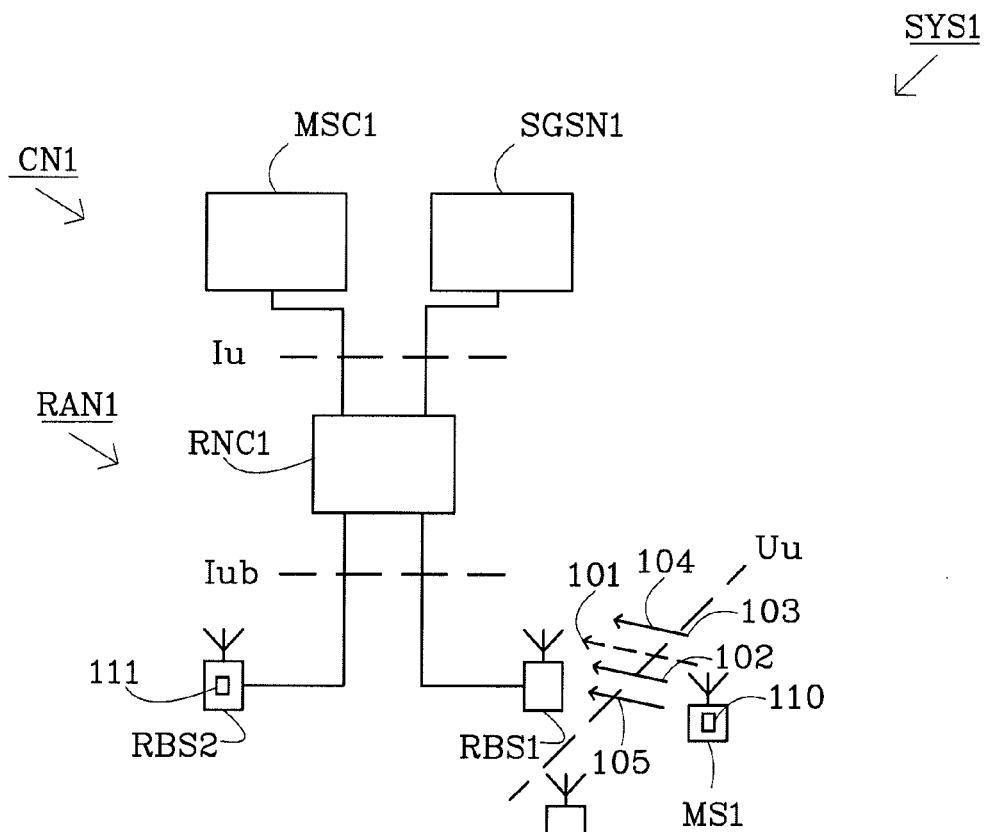
FIG. 1 is a schematic view of a non-limiting example of a wireless communication system in which the present invention may be implemented.

FIG. 1 illustrates a non-limiting example of a wireless communication system SYS1 in which the present invention may be employed. The exemplary communication system SYS1 illustrated in FIG. 1 is a 3GPP Universal Mobile Telecommunication System (UMTS). The communication system SYS1 includes a core network CN1, a UMTS Terrestrial Radio Access Network (UTRAN) RAN1 and User Equipment (UE), alternatively referred to as mobile stations (MS).

The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services.

Each of the core network nodes MSC1 and SGSN1 connects to the radio access network RAN1 over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface. Mobile stations, such as mobile stations MS1 and MS2 shown in FIG. 1, communicate with one or more radio base stations RBS1-RBS2 over a radio or air interface referred to as the Uu interface.

Each of the radio interface Uu, the Iu interface and the Iub interface are shown by dashed lines in FIG. 1

Figure 2:
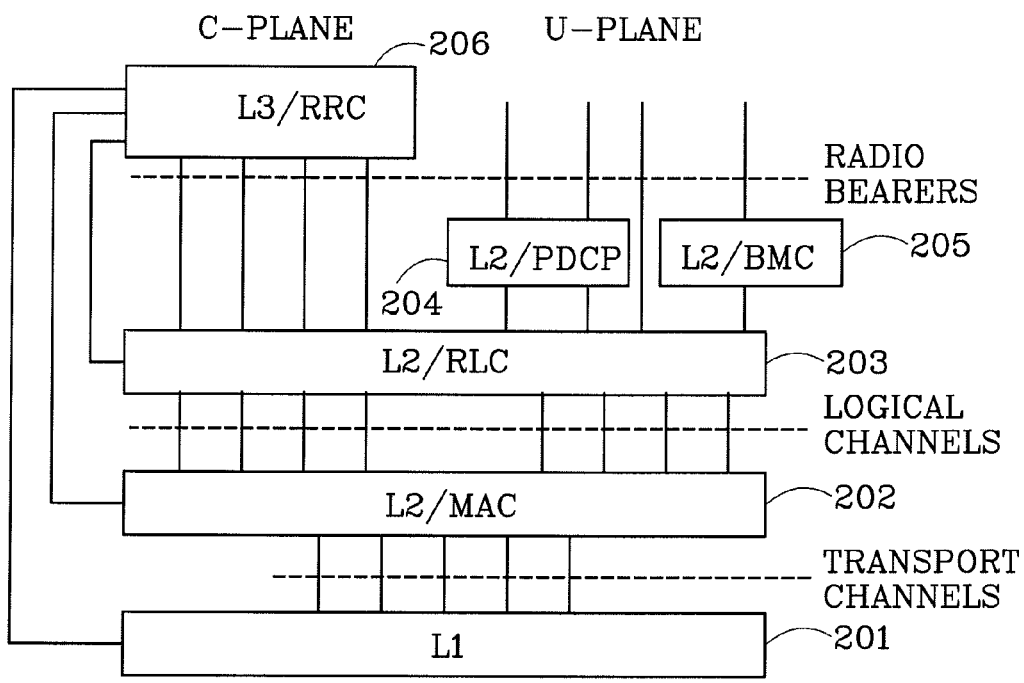
FIG. 2 is a block diagram providing a simplified illustration of the radio interface architecture of the communication system in FIG. 1.

FIG. 2 is a simplified illustration of the radio interface architecture of the UMTS system illustrated in FIG. 1.

The radio interface is layered into three protocol layers:
the physical layer, also referred to as Layer 1 (L1)
the data link layer, also referred to as Layer 2 (L2)
the network layer, also referred to as Layer 3 (L3).

Layer 2 is split into a number of sublayers including Medium Access Control (MAC) 202, Radio Link Control (RLC) 203, Packet Data Convergence Protocol (PDCP) 204 and Broadcast/Multicast Control (BMC) 205.

Layer 3 and the RLC-sublayer are further divided into a Control-plane (C-plane) and a User-plane (U-plane) while the PDCP- and BMC-sublayers exist in the U-Plane only. The U-plane protocols implements so called radio access bearer services, i.e. services for carrying user data (e.g. speech, data or multimedia) between mobile stations and the core network. The C-plane provides a Radio Resource Control (RRC) protocol for controlling the radio access bearers and the connection between mobile stations and the network from different aspects.

The physical layer 201 offers information transfer services to the MAC-layer and higher layers. The physical layer transport services are described by how and with what characteristics data are transferred over the radio interface. These services are denoted Transport Channels. The physical layer 201 is responsible for mapping the transport channels onto physical channels of the radio interface Uu. The physical layer 201 performs functions including FEC encoding/decoding and interleaving/deinterleaving of transport channels, multi-plexing/demultiplexing of transport channels, rate matching, modulation/demodulation and spreading/despreading of physical channels, closed-loop power control and RF-processing.

The MAC-sublayer 202 provides data transfer services on logical channels. A set of logical channel types is defined for different kinds of data transfer services offered by the MAC-sublayer. Each logical channel type is defined by what type of information is transferred. The MAC-sublayer 202 performs functions including mapping between logical channels and transport channels, selection of appropriate transport format for each transport channel depending on instantaneous source rate, transport channel type switching and ciphering.

The RLC-sublayer 203 provides different data transfer services to higher layers including transparent, unacknowledged and acknowledged data transfer. The RLC-sublayer 203 performs functions including segmentation and reassembly of higher layer protocol data units, concatenation, ciphering, error correction and flow control.

The PDCP-sublayer 204 provides transfer of user data and header compression/decompression.

The BMC-sublayer 205 provides a broadcast/multicast transmission service in the user plane for common user data in unacknowledged mode.

The UMTS system illustrated in FIG. 1 supports the new transport channel Enhanced Dedicated Channel (E-DCH) in the uplink direction (i.e. for transmissions from mobile stations such as mobile station MS1 to the radio access network RAN1) which was introduced in 3GPP Release 6. This Enhanced uplink, also known as HSUPA (High Speed Uplink Packet), provides higher throughput, reduced latency and increased capacity.

There is at most one E-DCH transport channel per E-DCH capable mobile station e.g. mobile station MS1 and the E-DCH transport channel is mapped onto a set (one or more) of E-DCH Dedicated Physical Data Channels (E-DPDCHs). Each E-DCH transport channel is further supported by a E-DCH Dedicated Physical Control Channel (E-DPCCH) providing information in the uplink direction to the network for enabling a radio base station e.g. the first radio base station RBS1 to demodulate and decode the data transmission. FIG. 1 schematically illustrates an example scenario of an E-DCH transport channel 101 established for uplink transmissions from the mobile station MS1 to the first radio base station RBS1. The E-DCH transport channel 101 is mapped onto an E-DPDCH channel 102 and supported by an E-DPCCH channel 103.

The E-DCH power control works in a similar manner as for the so called Dedicated (DCH) transport channel.

The E-DPDCH transmission power is defined relative to the uplink Dedicated Physical Control Channel (DPCCH) (schematically illustrated as 105 in FIG. 1). Each E-DCH Transport Format Combination has an associated E-DPDCCH gain factor $\beta_{ed}$ defining the relationship between the E-DPDCH and uplink DPCCH transmission powers together with the DPCCH gain factor $\beta_c$. If the DPCCH power is $P_{DPCCH}$, then E-DPDCH is transmitted using the power $$P_{E\text{-}DPDCH} = P_{DPCCH} * (\beta_{ed}/\beta_c)^2$$

Hence the E-DPDCH power offset in linear scale is given by $(\beta_{ed}/\beta_c)^2$. However, some exceptions exists, for example when the available UE power is insufficient.

The E-DCH power control utilizes both an inner loop power control (ILPC) function and an outer loop power control (OLPC) function.

For the example scenario of FIG. 1 wherein the E-DCH Transport Channel 101 has been established between the mobile station MS1 and the first radio base station RBS1, power control would typically be performed as follows.

The first radio base station RBS1 performs inner loop power control by estimating a received Signal-to-Interference ratio (SIR) of the Dedicated Physical Control Channel 105 and comparing it to a signal quality target value in the form of a target SIR. Based on the result, the first radio base station RBS1 issues transmit power control (TPC) commands to the mobile station MS1 ordering it to increase or decrease its transmission power depending on whether the estimated SIR was below or above the target SIR. The transmit power commands are sent to the mobile station in a downlink Dedicated Physical Control Channel (DPCCH).

The target SIR is provided by the outer loop power control function performed by the radio network controller RNC1. Communication quality, for E-DCH transport channels typically defined as a certain targeted number of transmission attempts in an Hybrid ARQ (HARQ) process associated with the E-DCH transport channel, is evaluated. If the communication quality is too low, i.e. the number of transmission attempts are above the set target, the target SIR is increased while if the communication quality is too high, i.e. the number of transmission attempts are below the set target, the target SIR is decreased. Changes in the target SIR is communicated from the radio network controller to the first radio base station RBS1.

System capacity and spectrum efficiency may be improved in 3GPP UMTS systems by scheduling only one (or a few) mobile stations at each moment of time for data transmissions on E-DCHs in a cell. Such uplink scheduling operation (sometimes referred to as Time Division Multiplexing) improves the uplink data rates achievable by reducing the interference from other connections.

It has been recognized internally within Ericsson that operating EUL transmissions using Time Division Multiplexing causes large variations in the effective interference levels experienced by a radio base station when receiving uplink DPCCH transmissions from a mobile station depending on whether or not the mobile station is scheduled for transmitting data (i.e. is transmitting at least one E-DPDCH). When the mobile station is transmitting at least one E-DPDCH, the interference received at the radio base station from the mobile stations uplink E-DPDCH transmissions is fairly orthogonal to the mobile stations uplink DPCCH transmissions and no (or only a few) other mobile station in the cell is simultaneous scheduled for EUL transmissions. In contrast, when the mobile station is not scheduled for transmitting data (i.e. not transmitting E-DPDCH), most likely at least one other mobile station in the cell is transmitting E-DPCCH causing interference which is fully non-orthogonal to the mobile stations It has further been recognized that the present power control functions of UMTS systems are ill adapted to handle such large variations in effective interference which may occur when operating with scheduled uplink data transmissions as demonstrated above.

Embodiments of the present invention enable improved power control of uplink data transmissions in a wireless communication system operating with scheduled transmissions.

FIG. 3A-3B illustrate a first exemplary method according to the invention in a wireless communication system, e.g. in radio base station RBS1 of the radio access network RAN1 in FIG. 1, for controlling uplink transmit power for a first mobile station, e.g. mobile station MS1 in FIG. 1, operating with scheduled uplink data transmissions.

FIG. 4 schematically illustrates a first exemplary embodiment of a radio base station according to the invention for performing the method illustrated in FIG. 3A-3B. The radio base station includes a Signal-to-Interference ratio (SIR) estimating functional unit 401, a Transmission Power Command (TPC) generator unit 402 and a control unit 403. The SIR estimator 401 estimates signal quality (represented as SIR in this embodiment) of uplink DPCCH transmissions from the first mobile station. The SIR estimator 401 includes a receiver 404, first and second interference filters 405 and 406 and a combiner 407. The receiver may be e.g. a RAKE or a GRAKE receiver, possibly utilizing signals from multiple antennas. The receiver may also implement interference cancellation means, where some of the interference is cancelled. Such schemes include sequential interference cancellation, parallel interference cancellation, partial parallel interference cancellation, multiuser detection etc.

The receiver 404 receives a base band signal 408 and from this base band signal, the receiver measures received uplink signal power 409 and received uplink interference power 410.

The control unit 403 keeps track of the uplink scheduling status of the first mobile station (scheduled to transmit data or not scheduled to transmit data) and based on detected changes in scheduling status, controls which one of the first and second interference filters are active for filtering of uplink interference measurements 410. The control unit may be implemented as part of a scheduler in the radio base station for scheduling Enhanced uplink transmissions by mobile stations in a cell served by the radio base station. Alternatively it could be implemented as a separate unit in the radio base station responsive to the scheduling decisions made by the scheduler for a particular mobile station.

The combiner 407 produces an estimated signal quality 412 for the uplink transmission from the first mobile station by combining the received uplink power 409 with the filtered interference measurements 411 from the currently active interference filter.

For each time slot, the TPC generator unit 402 generates an uplink transmit power command 414 for the first mobile station based on a comparison of the estimated signal quality 412 and a signal quality target 413.

At step 301 of FIG. 3A, a check is made by the control unit 403 whether the scheduling status for the first mobile station has changed. If the scheduling status has not changed (an alternative NO at step 301), processing returns to step 301.

If a change in uplink scheduled status for the first mobile station is detected (an alternative YES at step 301), the filtering of uplink interference measurements are adapted in step 302 to account for the detected change in uplink scheduled status so that uplink interference measurements made during periods of time when the first mobile station is not scheduled to transmit data are filtered separately from uplink interferences measurements made during periods of time when the first mobile station is scheduled to transmit data. In this exemplary embodiment of the invention, this step is performed by switching between the first and second interference filters 405 and 406. Hence, if the detected change in scheduling status was from non scheduled status to scheduled status, the SIR estimator unit 401 would switch from using the first interference filter 405 to using the second interference filter 406 for filtering the uplink interference measurements 410 provided by the receiver 404 during periods of time when the first mobile station is scheduled to transmit data. If the detected change in scheduling was from scheduled status to non scheduled status, the SIR estimator unit 401 would instead switch from using the second interference filter 406 to using the first interference filter 405 for filtering the uplink interference measurements 410 during periods of time when the first mobile station is not scheduled to transmit data. Preferably, the filtering states of both filters 405 and 406 are maintained when the respective filter is inactive.

At step 303, the combiner 407 combines the received uplink power 409 with the filtered interference measurements 411 from the currently active interference filter and thus produces an estimated signal quality 412 for the uplink transmission from the first mobile station based on received signal strength and the filtered uplink interference measurements.

At step 304, the TPC generator unit 402 generates an uplink transmit power command 414 for the first mobile station based on a comparison of the estimated signal quality 412 and a signal quality target 413. Hence, if the estimated signal quality 412 is below the signal quality target, a transmit power command ordering the first mobile station to increase its uplink transmit power is generated and if the estimated signal quality 412 is above the signal quality target, a transmit power command ordering the first mobile station to decrease its uplink transmit power is generated. Since the signal quality target is provided by the outer loop power control function based on communication quality, typically changes of signal quality target and detected changes scheduling status for the first mobile station do not coincide in time.

In the first exemplary embodiments of a method in a wireless communication network and a radio base station according to the invention, the processing steps 301-304 illustrated in FIG. 3A-3B and the functional units 401-407 in FIG. 4 are implemented using digital data processing circuitry in the form of one or more conventional programmable processors 111 in the radio base station.

Apart from the exemplary first embodiments of the invention disclosed above, there are several ways of providing rearrangements, modifications and substitutions of the above disclosed embodiment resulting in additional embodiments of the invention.

FIG. 5A-5B illustrate a second exemplary method according to the invention in a wireless communication system, e.g. in radio base station RBS1 of the radio access network RAN1 in FIG. 1, for controlling uplink transmit power for a first mobile station, e.g. mobile station MS1 in FIG. 1, operating with scheduled uplink data transmissions. FIG. 6 schematically illustrates a second exemplary embodiment of a radio base station according to the invention for performing the method illustrated in FIG. 5A-5B.

As illustrated in FIG. 6, in this exemplary embodiment the radio base station includes a Signal-to-Interference ratio (SIR) estimating functional unit 601, a Transmission Power Command (TPC) generator unit 602 and a control unit 603. The SIR estimator 601 estimates signal quality (represented as SIR in this embodiment) of uplink DPCCH transmissions from the first mobile station. The SIR estimator 601 includes a receiver 604, an interference filter 605 and a combiner 606.

The receiver 604, combiner 606 and TPC generator 602 operate in the same way as the corresponding units in FIG. 4, but the control unit 603 and the SIR estimator 601 operate in a slightly different manner than the corresponding units in FIG. 4 as demonstrated below.

At step 501 of FIG. 5A, a check is made by the control unit 603 whether the scheduling status for the mobile station has changed. If the scheduling status has not changed (an alternative NO at step 501), processing returns to step 501.

If a change in uplink scheduled status for the mobile station is detected (an alternative YES at step 501), the filtering of uplink interference measurements 610 are adapted in step 502 to account for the detected change in uplink scheduled status for the first mobile station so that uplink interference measurements made during periods of time when the first mobile station is not scheduled to transmit data are filtered separately from uplink interferences measurements made during periods of time when the first mobile station is scheduled to transmit data. In this exemplary embodiment of the invention, this step is performed by resetting the filter (i.e. interference filter 605) used for filtering of the uplink interference measurements.

At step 503, the combiner 606 combines received uplink power 609 with the filtered interference measurements 611 from the interference filter 605 and thus produces an estimated signal quality 612 for the uplink transmission from the first mobile station based on received signal strength 609 and the filtered uplink interference measurements 611.

At step 504, the TPC generator unit 602 generates an uplink transmit power command 614 for the first mobile station based on a comparison of the estimated signal quality 612 and a signal quality target 613.

FIG. 7A and FIG. 7B illustrates a third exemplary embodiment of a method according to the invention in a wireless communication system, e.g. in radio base station RBS1 of the radio access network RAN1 in FIG. 1, for controlling uplink transmit power for a first mobile station, e.g. mobile station MS1 in FIG. 1, operating with scheduled uplink data transmissions. FIG. 8 schematically illustrates a third exemplary embodiment of a radio base station according to the invention for performing the method illustrated in FIG. 7A-7B. The difference between the second exemplary embodiment of a radio base station and the third exemplary embodiment of a radio base station is that in the third exemplary embodiment the control unit 803 monitors scheduling status for a second mobile station and interacts with the SIR estimating functional unit 801 to adapt filtering of uplink interference measurements for the first mobile station to take account of detected changes in scheduling status for the second mobile station. The second mobile station may be any mobile station, e.g. mobiles station MS2 in FIG. 1, operating within the same cell as the first mobile station, e.g. mobile station MS1 in FIG. 1. Preferably, the control unit 803 is set up to monitor the scheduling of all mobile stations within the same cell as the first mobile station and to adapt interference filtering for the first mobile station in response to detected changes in scheduling status for any of the other mobile stations in the same cell as the first mobile station.

At step 701 of FIG. 7A, a check is made by the control unit 803 whether the scheduling status for a second mobile station within the same cell as the first mobile station has changed. If the scheduling status has not changed (an alternative NO at step 701), processing returns to step 701.

If a change in uplink scheduled status for the second mobile station is detected (an alternative YES at step 701), the filtering of uplink interference measurements 810 for the first mobile station is adapted in step 702 to account for the detected change in uplink scheduled status for the second mobile station by applying an estimated expected change in interference for the first mobile station associated with the detected change in scheduling status for the second mobile station to adjust a current interference filtering state of the interference filter 805.

At step 703, the combiner 806 combines received uplink power 809 with the filtered interference measurements 811 from the interference filter 805 and thus produces an estimated signal quality 812 for the uplink transmission from the first mobile station based on received signal strength 809 and the filtered uplink interference measurements 811.

At step 704, the TPC generator unit 802 generates an uplink transmit power command 614 for the first mobile station based on a comparison of the estimated signal quality 812 and a signal quality target 813.

The interference filter 805 for filtering of uplink interference measurements for the first mobile station typically has a state that corresponds to the average interference. As an example, consider an exponential interference filter $$I_{filt}(t)=\lambda *I_{meas}(t)+(1-\lambda)*I_{filt}(t-1) \qquad (1)$$

where $I_{meas}(t)$ is the estimated or measured interference, $I_{filt}(t)$ is the exponential filter state and the filter output for the current time period, $I_{filt}(t-1)$ is the exponential filter state and the filter output for the previous time period, and $\lambda$ is the forgetting factor. In exponential filters, the forgetting factor adjusts the weight of the new information (the measurement) relative the weight of the filter history. For example, $\lambda=0.1$ weights the new information by 10% and the filter history by 90%, when forming the updated filter state.

When a change in uplink scheduling status for the second mobile station has been detected at time $t_0$, the expected change in average interference is $\Delta_I(t_0)$, and the filter state $I_{filt}(t_0)$ is adjusted at step 702 according to Equation (2)

$$I_{filt}(t_0)=I_{filt,pre\ adjustment}(t_0)+\Delta_I(t_0) \qquad (2)$$

where $I_{filt,pre\ adjustment}(t_0)$ is the current interference filtering state at time t0 prior to the adjustment.

This gives a new value of the filter state $I_{filt}(t_0)$, which then is used in the subsequent filtering calculations.

The uplink interference contributions ranges from background noise, uplink transmissions from mobile stations in neighboring cells, and uplink transmissions from other mobile stations in the same cell as the first mobile station. The background noise and the neighboring cell interference contribution can be grouped together. However, the interference contributions from each mobile station in the same cell as the first mobile station can be estimated. Furthermore, since the relation between uplink scheduled state and resulting interference contribution is known, it is possible to estimate the expected interference change based on uplink scheduled state changes for any other mobile station in the cell.

The relation between uplink scheduled state and interference contribution is typically known in the uplink scheduler of the radio base station serving the cell (e.g. RBS1) and is used as input to the resource management decisions. For a non-limiting example, the power offset in dB $P_{off}(TFC)$, $(\beta_{ed}/\beta_c)^2$ in linear scale, for each Transport Format Combination (TFC) is agreed upon between a mobile station and the radio access network RAN1 at link setup. The received DPCCH signal strength, denoted RSCP—Received Signal Code Power, may be estimated in dBm for each mobile stations in the same cell as the first mobile station. For each mobile station, the received E-DPDCH power $P_{E-DPDCH}$ is equal to $$P_{E-DPDCH}=RSCP+P_{off}(TFC)[dBm] \qquad (3)$$

In this non-limiting example, if the uplink scheduling status changes for a second mobile station in the cell at time $t_0$ from not scheduled to transmit data ($P_{off}=0$) to scheduled to transmit data at a max rate corresponding to transport format $TFC_0$, the interference contribution from that second mobile station will change from $$P_{E-DPDCH}=RSCP(t_0)[dBm] \qquad (4)$$

to $$P_{E-DPDCH}=RSCP(t_0)+P_{off}(TFC_0)[dBm] \qquad (5).$$

The change in interference contribution from the second mobile station associated with the detected change in scheduling status, i.e. $P_{off}(TFC_0)$, can be used as a measure of the expected change in average interference $\Delta_I(t_0)$ and applied to update the current filtering status at step 702 in accordance with equation (2).

Modified versions of first and second embodiments of the present invention may be provided where, in addition to adapting filtering to account for detected changes in scheduling status for the first mobile station, the scheduling status for a second mobile station is monitored and detected changes in scheduling for the second mobile station triggers applying an estimated expected change in interference associated with the detected change in scheduling status for the second mobile station to adjust a current interference filtering state for the first mobile station in a similar way as in the third exemplary embodiment.

The different embodiments of methods and apparatuses according to the invention disclosed above may all be implemented the same way as for the first exemplary embodiments, i.e. utilizing digital data processing circuitry in the form of one or more conventional programmable processors to perform the different processing steps of the methods. However, any digital data processing circuitry capable of performing said processing could be used, e.g. an ASIC, a discrete logic circuit etc. It is also possible to use a combination of different kinds of digital data processing circuitry. In the first exemplary embodiments of the invention, as in other embodiments of the invention using programmable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 9) etc. Programmable devices performing processing according to the invention, can be dedicated to this task or used also for processing relating to other tasks.

Even though the invention in the exemplary embodiments disclosed above has been applied in the context of Enhanced Uplink of a UMTS radio communication system, the invention is also generally applicable in other contexts (e.g. CDMA2000) where, mobile stations are capable of operating with scheduled uplink data transmissions.

The invention claimed is:

1. A method in a wireless communication system for controlling uplink transmit power for a first mobile station operating with scheduled uplink data transmissions, the method comprising:
   detecting a change in uplink scheduled status for a second mobile station;
   adapting filtering of uplink interference measurements for the first mobile station to account for the detected change in uplink scheduled status for the second mobile station, and applying an estimated expected change in interference associated with the detected change in scheduling status for the second mobile station to adjust a current interference filtering state for the first mobile station;
   estimating a signal quality for uplink transmissions from the first mobile station based on measurements of received signal strength from the mobile station and the filtered uplink interference measurements; and
   generating an uplink transmit power command for the first mobile station based on a comparison of the estimated signal quality to a signal quality target.

2. The method according to claim 1, where said adapting filtering of uplink interference measurements includes:
   filtering uplink interference measurements made during periods of time when the first mobile station is not scheduled to transmit data separately from uplink interference measurements made during periods of time when the first mobile station is scheduled to transmit data.

3. The method according to claim 2, where said adapting filtering includes:
   switching between a first filter and a second filter for filtering of the uplink interference measurements,
   where the first filter filters uplink interference measurements during periods of time when the first mobile station is not scheduled to transmit data and the second filter filters uplink interference measurements during periods of time when the first mobile station is scheduled to transmit data.

4. The method according to claim 2, where said adapting filtering includes:
   resetting a filter used for filtering of the uplink interference measurements.

5. The method according to any claim 1, where the estimated signal quality relates to a signal quality of an uplink control channel signal that is transmitted by the first mobile station during and between the scheduled uplink data transmissions.

6. The method according to claim 5, where the uplink control channel signal is a 3GPP Dedicated Physical Control Channel signal and the scheduled uplink data transmissions occurs using at least one 3GPP Enhanced Dedicated Physical Data Channel.

7. A method in a wireless communication system for controlling uplink transmit power for a first mobile station operating with scheduled uplink data transmissions, the method comprising:
   detecting a change in scheduling status for a second mobile station;
   adapting filtering of uplink interference measurements for the first mobile station to account for the detected change in uplink scheduled status for the second mobile station by applying an estimated expected change in interference associated with the detected change in scheduling status for the second mobile station to adjust a current interference filtering state for the first mobile station;
   estimating a signal quality for uplink transmissions from the first mobile station based on measurements of received signal strength from the first mobile station and the filtered uplink interference measurements; and
   generating an uplink transmit power command for the first mobile station based on a comparison of the estimated signal quality to a signal quality target.

8. A radio base station capable of controlling uplink transmit power for a first mobile station operating with scheduled uplink data transmissions, said radio base station comprising:
   estimating means for estimating signal quality for uplink transmissions from the first mobile station based on measurements of received signal strength from the first mobile station and filtered uplink interference measurements;
   generating means for generating an uplink transmit power command for the first mobile station based on a comparison of the estimated signal quality to a signal quality target; and
   detecting means for detecting a change in uplink scheduled status for a second mobile station;
   where said estimating means is to account for detected changes in uplink scheduled status for the second mobile station by adapting filtering of the uplink interference measurements for the first mobile station to account for the detected change in uplink scheduled status for the second mobile station, and where said estimating means is to apply an estimated expected change in interference associated with the detected change in scheduling status for the second mobile station to adjust a current interference filtering state for the first mobile station.

9. The radio base station according to claim 8, where said estimating means is to account for the detected changes in uplink scheduled status for the first mobile station by filtering uplink interference measurements made during periods of time when the first mobile station is not scheduled to transmit data separately from uplink interference measurements made during periods of time when the first mobile station is scheduled to transmit data.

10. The radio base station according to claim 9, where said estimating means is to account for the detected changes in uplink scheduled status for the first mobile station by switching between a first filter and a second filter for filtering of the uplink interference measurements,
   where the first interference filter filters uplink interference measurements during periods of time when the mobile station is not scheduled to transmit data and the second interference filter filters uplink interference measurements during periods of time when the mobile station is scheduled to transmit data.

11. The radio base station according to claim 9, where said estimating means is to account for detected changes in uplink scheduled status for the first mobile station by resetting an interference filter used for filtering of the uplink interference measurements.

12. The radio base station according to claim 8, where the estimated signal quality relates to a signal quality of an uplink control channel signal that is transmitted by the first mobile station during and between the scheduled uplink data transmissions.

13. The radio base station according to claim 12, where the uplink control channel signal is a 3GPP Dedicated Physical Control Channel signal and the scheduled uplink data transmissions occurs using at least one 3GPP Enhanced Dedicated Physical Data Channel.

14. A radio base station capable of controlling uplink transmit power for a first mobile station operating with scheduled uplink data transmissions, said radio base station comprising:
   estimating means for estimating signal quality for uplink transmissions from the first mobile station based on measurements of received signal strength from the first mobile station and filtered uplink interference measurements;
   generating means for generating an uplink transmit power command for the first mobile station based on a comparison of the estimated signal quality to a signal quality target; and
   means for detecting a change in scheduling status for a second mobile station,
   where said estimating means is to adapt filtering of uplink interference measurements for the first mobile station to account for the detected change in uplink scheduled status for the second mobile station by applying an estimated expected change in interference associated with the detected change in scheduling status for the second mobile station to adjust a current interference filtering state for the first mobile station.

15. A non-transitory computer-readable medium embodied with a computer program and executable by digital data processing circuitry to perform a method, the method comprising:
   detecting a change in uplink scheduled status for a second mobile station;
   adapting filtering of uplink interference measurements for a first mobile station to account for the detected change in uplink scheduled status for the second mobile station, and applying an estimated expected change in interference associated with the detected change in scheduling status for the second mobile station to adjust a current interference filtering state for the first mobile station;
   estimating a signal quality for uplink transmissions from the first mobile station based on measurements of received signal strength from the mobile station and the filtered uplink interference measurements; and
   generating an uplink transmit power command for the first mobile station based on a comparison of the estimated signal quality to a signal quality target.

16. The non-transitory computer-readable medium of claim 15, where the adapting filtering of uplink interference measurements includes:
   filtering uplink interference measurements made during periods of time when the first mobile station is not scheduled to transmit data separately from uplink interference measurements made during periods of time when the first mobile station is scheduled to transmit data.

17. The non-transitory computer-readable medium of claim 16, where the adapting filtering includes: switching between a first filter and a second filter for filtering of the uplink interference measurements,
   where the first filter filters uplink interference measurements during periods of time when the first mobile station is not scheduled to transmit data and the second filter filters uplink interference measurements during periods of time when the first mobile station is scheduled to transmit data.

* * * * *